Patented June 15, 1943

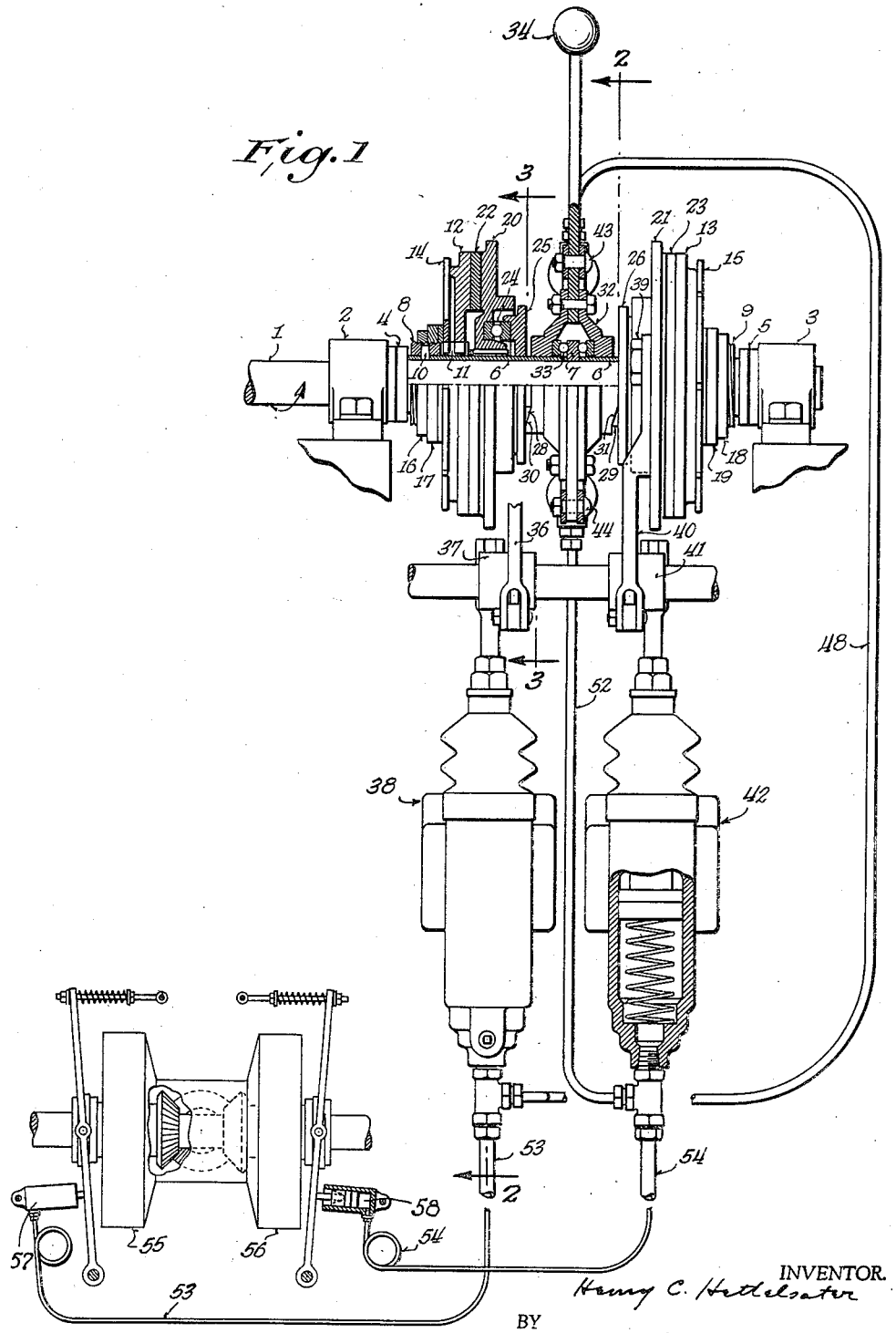

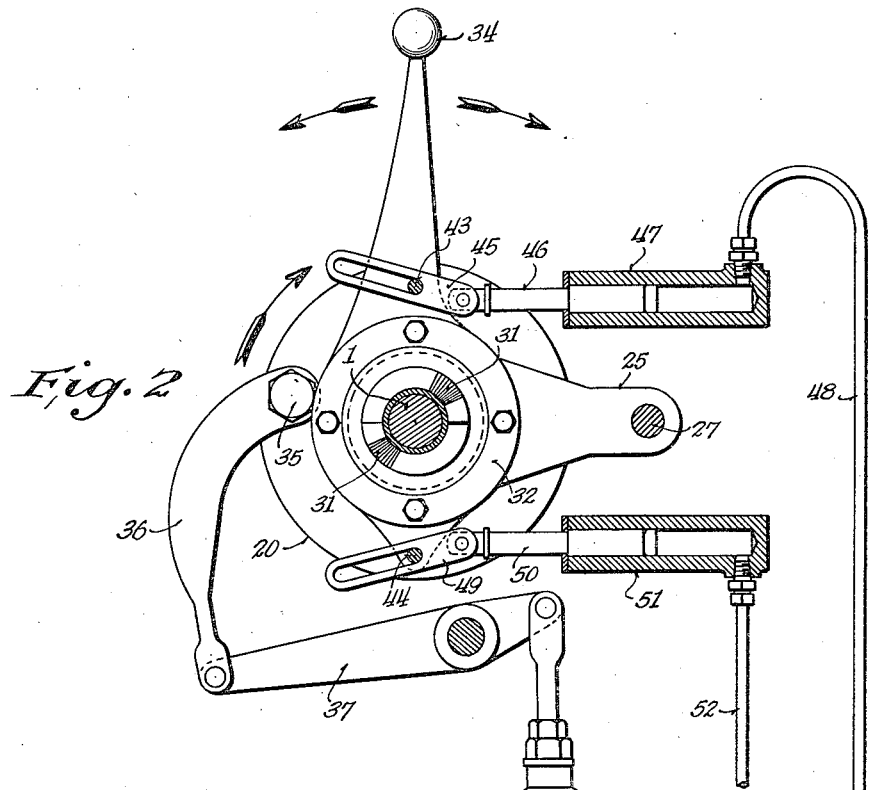
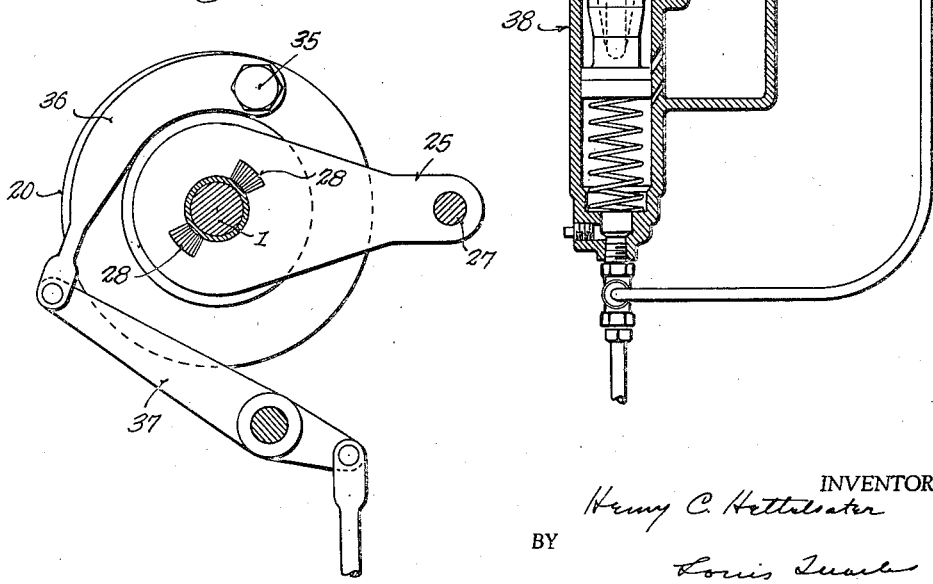

2,322,133

UNITED STATES PATENT OFFICE 2,322,133

HYDRAULIC POWER ACTUATOR

Henry C. Hettelsater, Milwaukee, Wis., assignor to Harnischfeger Corporation, Milwaukee, Wis., a corporation of Wisconsin Application June 30, 1939, Serial No. 282,040

2 Claims. (Cl. 60—54.5)

This invention relates to apparatus for transmitting to a distance externally supplied control energy in amounts and at intensities which are regulated by the intensity of an initial controlling force. The improvement constituting this invention resides in a novel arrangement of a continuously sliding friction clutch adapted for manually controlled, continuously sliding, torque transmitting engagement, combined with means for applying the resulting torque to the creation of hydraulic pressure in an hydraulic system, which hydraulic system includes means for opposing movement of the manual control member with a small force proportioned to pressures created in said hydraulic system. By reason of the novel arrangement of this invention, an operator thereof is capable of sensing directly the result of manually applied control effort, thus giving the operator a direct feel of the load without dependence upon intermediate effects, which at times are inclined to be variable.

Heretofore in controls of the type in which the operator's manual control is supplemented by power furnished from an outside force, difficulty has been experienced by operators because of the difficulty of gaging the output effort resulting from the manual effort applied to the control. To counteract this difficulty some have attempted to employ continuously sliding clutches, the output torque of which is returned in part to oppose the effort applied to cause engagement of the clutch. The precise feel of the load desired, however, is not always obtainable in this way, due to variation in friction coefficients, transmission losses, and the like. In this invention, however, the actual output effort is caused to exert a small but precisely proportioned opposing force against the manual effort exerted by the operator and, as a result, a markedly improved feel of the load is obtained.

This invention is herein described with the aid of the accompanying drawings, forming a part hereof, and by reference to specific embodiments or instances of the invention, the same being set forth by way of illustration only and not of limitation.

In the drawings:

Fig. 1 is a side elevation, with parts broken away, showing one form of the apparatus of this invention;

Fig. 2 is a detail cross-sectional view taken at the plane 2—2 of Fig. 1; and

Fig. 3 is a detail of some of the parts of the apparatus shown in Fig. 1, shown in section through the plane 3—3 of Fig. 1.

As an instance of an embodiment of the control system of this invention, there is shown in the drawings a structure employing a pair of power-transmitting clutches which furnish forward and reverse drive to a driven shaft, such as is employed for causing the swinging motion of the rotating cab, cranes, and excavator. The apparatus of the invention, however, is, of course, equally well adapted for a wide variety of control purposes.

Since one of the principal purposes to be accomplished by the apparatus of this invention is to provide power or servo means for actuating controls and thus to reduce control effort required of the operator, a source of power is provided in the form of a continuously turning shaft 1, driven in the direction shown by the arrow in Fig. 1, by a source of mechanical energy not shown. The shaft 1 is supported to turn in radial bearings 2 and 3 and is held against endwise movement by thrust-bearings 4 and 5 acting in conjunction with a pair of positioning sleeves 6—6. Between the two position sleeves 6—6, a center race 7 is held on the shaft 1 against endwise movement. Encircling opposite ends of the positioning sleeves 6 collars 8 and 9 are provided. These collars are securely held in place by pins 10, one of which is shown to the left in Fig. 1. Pins 10 pass through the collars 8 and 9, through the positioning sleeves 6 and through the shaft 1 so as to hold the parts named securely in place.

The collars 8 and 9 are symetrical in form and, as shown in the case of collar 8, are provided with inwardly projecting driving feathers 11, which are adapted to engage the correspondingly splined hubs of cushioned friction-driving discs 12 and 13. The driving discs 12 and 13 are backed by cushioning plate springs 14 and 15, which are likewise centrally bored and splined to engage the feathers 11. As shown, the collars 8 and 9 are externally threaded and engaged by locknuts 16—17 and 19—18, which form an adjustable backing for the cushioning springs 14 and 15.

A pair of torque-receiving, or driven, discs 20 and 21 are journalled to turn freely upon positioning sleeves 6, as shown, and are positioned to be engaged by friction lining material 22 and 23, which is securely fastened to the faces of driving discs 12 and 13, respectively. The torque-receiving discs 20 and 21 are not only journalled upon positioning sleeve 6 to permit relative turning movement, but are also free to move axially and means to cause such movement is provided in the form of thrust bearings, These thrust bearings are similar in form, one being shown at 24 in the left-hand portion of Fig. 1. The thrust bearings are acted upon in turn by thruster members 25 and 26, which are free to move axially along positioning sleeves 6, but which are held against rotation by a projecting lug which engages a steadying rod 27, as shown clearly in Figs. 2 and 3. Projecting inwardly from the inward faces of thruster members 25 and 26 are helical cams 28 and 29, positioned to be engaged by helical cam faces 30 and 31, which project outwardly from the face of a centrally mounted controller hub 32. The controller hub 32 is free to rotate about the positioning sleeves 6, but is held against endwise or axial displacement by means of a symmetrical thrust-bearing 33, which engages the opposite sides of center race 7, previously described.

Projecting from the periphery of controller hub 32 is a controller handle 34, adapted to be moved as indicated by the arrows in Fig. 2 under the manual control of an operator. It will be noted that when the controller handle 34 is moved clockwise, as indicated by the arrow in Fig. 2, thruster member 25 moves toward the left and causes engagement between the friction lining on clutch disc 12 and torque-receiving member 20, thus giving rise to a torque in the latter member, which torque is utilized and resisted by an hydraulic system connected thereto through crank-pin 35, connecting-link 36, rocker-arm 37, and pressure-generating member 38, the parts being shown clearly in their initial position in Fig. 2 and in the position of maximum displacement under influence of said torque in Fig. 3. It will be noted that the torque-receiving member 20 is restricted in its movement to but a fraction of one revolution and that it is intended that continuously slipping engagement occur between member 20 and the friction lining 22 of the clutch-disc 12 while the apparatus of this invention is in use.

On the opposite side of controller hub 32 symmetrical parts are utilized. Torque received in torque-receiving member 21 is resisted and utilized by an hydraulic system which engages said torque-receiving member 21 through the medium of crank-pin 39, connecting-link 40, rocker-arm 41, and pressure-generating member 42, which parts come into play upon counter-clockwise movement of the controlling handle 34, indicated by the appropriate arrow in Fig. 3. It will be apparent from the above description that an operator may alternately cause generation of pressure in either one or the other of the hydraulic systems described simply by moving the control handle 34 from the mid position clockwise or counter-clockwise and by reason of the torque in-put from shaft 1, substantial forces may be created in said hydraulic systems by the exertion of very moderate manual control pressure.

In order to provide a positive and reliable relationship between the manual control effort applied and the power-energized output pressure, upon which an operator may depend under all conditions, the apparatus of this invention is provided with hydraulic means which directly oppose movement of the manually-operated member. As shown clearly in Fig. 2, control lever 34 projects both above and below control hub 32 and is engaged by bolts 43 and 44, which pass therethrough. Bolt 43 in turn is engaged by a lost motion sliding link 45, which is pivotally connected with piston 46, the latter being arranged to slide in an opposing cylinder 47. By means of conduit 48, the opposing cylinder 46 is in direct hydraulic connection with the output of hydraulic pressure generators 38. In like manner, bolt 44 is engaged by a lost motion link 49, which pivotally engages piston 50, the latter being slidingly received in an opposing cylinder 51. Opposing cylinder 51 in turn is in direct hydraulic connection with hydraulic pressure-generating means 42 through conduit 52.

The output of hydraulic pressure-generating means 38 and 42 may be connected, for example, as shown in Fig. 1, through conduits 53 and 54, to any suitable device to be controlled, such as hydraulically-actuated clutches 55 and 56 which are actuated respectively by hydraulic motor means 57 and 58. It will be noted that upon clockwise movement of control lever 34, torque-receiving member 20 comes into action and hydraulic pressure is generated in the associated hydraulic system. This hydraulic pressure is communicated to opposing piston 46 and the operator immediately feels, in opposition to his controlling effort, a force which is related to the hydraulic pressure which has been created in the hydraulic system. By reason of the relatively small area of piston 46 and the substantial mechanical advantage arising from the geometry of the parts, the opposing force which is felt is not sufficient to render the actuation of control member 34 difficult or tiresome. At the same time, the opposing force which is felt is quite directly related to the intensity of the action taking place at the output end of the hydraulic system and this is true regardless of wear in the parts or vagaries of friction contact between the driving and driven parts of the friction clutch which is supplying the servo energy. Upon movement of control handle 34 in the opposite direction, an exactly equivalent response occurs in the hydraulic system associated therewith, due to the action of opposing piston 50, and by reason of lost motion links 45 and 49 both directions of movement of control member 34 are independently opposed.

There is thus derived through the apparatus of this invention servo control responses which are quite comparable in sensitivity to direct-acting control. In many applications, such as in the case of controls for load-lifting or digging machinery, this property of giving the operator a positive and reliable feel of the load is of utmost importance and in such applications the apparatus of this invention has been found to furnish to the operator this essential guiding sensation.

While the invention herein disclosed has been described by reference to a specific instance of an embodiment of the same, it is not intended that the protection of Letters Patent to be granted hereon be unnecessarily limited thereby, but that such protection shall extend to the full limit of the advance herein described as defined in the claims hereto appended.

That which I claim as my invention and wish to secure by Letters Patent is:

1. In an apparatus for mechanically producing alternate hydraulic control impulses by alternate movement of a single shiftable lever the combination comprising a pivotally mounted lever having a rest position from which it is movable in two directions, a lost motion link engaging said lever on one side of said pivot, a feeler cylinder having a piston engaging said lost motion link, a second lost motion link engaging said lever on the opposite side of its pivot, a second feeler cylinder having a piston engaging said second lost motion link, said lost motion links having a scope of lost motion such that movement of the lever from its rest point in one direction causes said first feeler piston to enter its cylinder while the other feeler piston remains stationary and movement of said lever from its rest position in the opposite direction causes the second feeler piston to enter its cylinder while the first feeler piston remains stationary, a continuously driven member, a pair of friction devices engageable with said driven member to be moved thereby, a separate hydraulic pressure generating means associated with each of said friction devices and and adapted when moved thereby to generate hydraulic pressure and to transmit the same to instrumentalities to be controlled, an hydraulic connection from each of said pressure generating means to one of said feeler cylinders, and thruster means associated with said lever for causing alternate engagement of said friction devices with said continuously driven means upon alternate movement of said lever in opposite directions from said rest point, said thruster means being adapted to cause engagement of that friction device which gives rise to pressure in that feeler cylinder against which said lever is moved.

2. In an apparatus for mechanically producing alternate hydraulic control impulses by alternate movement of a single shiftable lever the combination comprising a pivotally mounted lever having a rest position from which it is movable in two directions, lost motion means engaging said lever on one side of said pivot, an hydraulic feeler means adapted to hydraulically produce an indicating thrust engaging said lost motion means, a second lost motion means engaging said lever on the opposite side of its pivot, a second hydraulic feeler means adapted to hydraulically produce an indicating thrust engaging said second lost motion means, said lost motion means having a scope of lost motion such that movement of the lever from its rest point in one direction causes displacement to occur in said first hydraulic feeler means while the second hydraulic feeler means remains stationary and movement of the lever from its rest position in the opposite direction causes displacement to occur in said second hydraulic feeler means while the first hydraulic feeler means remains stationary, a continuously driven member, a pair of friction devices engageable with said driven member to be moved thereby, a separate hydraulic pressure generating means other than said feeler means associated with each of said friction devices and adapted when moved thereby to generate hydraulic pressure and to transmit the same to instrumentalities to be controlled, an hydraulic connection from each of said pressure generating means to one of said hydraulic feeler means, and a thruster associated with said lever for causing alternate engagement of said friction devices with said continuously driven member upon alternate movement of said lever in opposite directions from said rest point, said thruster being adapted to cause engagement of that friction device which gives rise to pressure in that hydraulic feeler means against which said lever is moved.

HENRY C. HETTELSATER.